United States Patent
Guill, Jr.

(10) Patent No.: US 8,185,122 B2
(45) Date of Patent: May 22, 2012

(54) METHOD FOR CREATING A CELLULAR TELEPHONE INFRASTRUCTURE

(75) Inventor: Dennis Jarret Guill, Jr., Frisco, TX (US)

(73) Assignee: Metropcs Wireless, Inc., Richardson, TX (US)

(*) Notice: Subject to any disclaimer, the term of this patent is extended or adjusted under 35 U.S.C. 154(b) by 1053 days.

(21) Appl. No.: 12/012,571

(22) Filed: Feb. 4, 2008

(65) Prior Publication Data

US 2008/0318583 A1  Dec. 25, 2008

Related U.S. Application Data

(60) Provisional application No. 60/896,222, filed on Mar. 21, 2007.

(51) Int. Cl.
*H04W 40/00* (2009.01)

(52) U.S. Cl. ..... 455/446; 455/405; 455/408; 455/456.1; 455/422.1

(58) Field of Classification Search .......... 455/405–409, 455/456.1–457, 446–449, 423–425, 67.11–67.16
See application file for complete search history.

(56) References Cited

U.S. PATENT DOCUMENTS

| | | | | |
|---|---|---|---|---|
| 5,293,640 | A * | 3/1994 | Gunmar et al. | 455/446 |
| 5,465,390 | A * | 11/1995 | Cohen | 455/446 |
| 5,490,285 | A * | 2/1996 | Ahlenius et al. | 455/446 |
| 5,710,758 | A | 1/1998 | Soliman et al. | |
| 5,963,867 | A * | 10/1999 | Reynolds et al. | 455/457 |
| 5,974,322 | A * | 10/1999 | Carlsson et al. | 455/446 |
| 6,111,857 | A | 8/2000 | Soliman et al. | |
| 6,141,557 | A * | 10/2000 | Dipiazza | 455/446 |
| 6,336,035 | B1 * | 1/2002 | Somoza et al. | 455/446 |
| 6,850,764 | B1 * | 2/2005 | Patel | 455/450 |
| 6,917,816 | B2 | 7/2005 | Abed et al. | |
| 7,050,813 | B1 * | 5/2006 | Paiz | 455/446 |
| 7,120,431 | B1 * | 10/2006 | Huo et al. | 455/423 |
| 7,454,193 | B2 * | 11/2008 | Hutcheson | 455/406 |
| 2004/0259555 | A1 * | 12/2004 | Rappaport et al. | 455/446 |
| 2008/0108365 | A1 * | 5/2008 | Buddhikot et al. | 455/452.1 |
| 2008/0200175 | A1 * | 8/2008 | Boffa et al. | 455/446 |

* cited by examiner

*Primary Examiner* — Sharad Rampuria
(74) *Attorney, Agent, or Firm* — Howison & Arnott, L.L.P.

(57) ABSTRACT

The Demographic Index (DI) was created for wireless communication network design, however has relevance in other marketing based applications. The DI combines a series of demographic census records into a single weighted index value that can be used to evaluate geographic importance in designing a wireless network.

51 Claims, 6 Drawing Sheets
(3 of 6 Drawing Sheet(s) Filed in Color)

METHOD FOR CREATING A CELLULAR TELEPHONE INFRASTRUCTURE

CROSS-REFERENCE TO RELATED APPLICATIONS

This application claims the benefit of priority of pending U.S. Provisional Application for Patent Ser. No. 60/896,222, filed Mar. 21, 2007, entitled METHOD FOR CREATING A CELLULAR TELEPHONE INFRASTRUCTURE, the specification of which is incorporated herein by reference.

TECHNICAL FIELD

This application pertains in general to a system and techniques for designing and deploying a cellular telephone network infrastructure and, more particularly, to designing of such infrastructure utilizing a combination of demographic aspects.

BACKGROUND

Referring to FIG. 1, a cellular communications system typically consists of four major components that work together to provide mobile service to subscribers. These components include a public switched telephone network (PSTN) 10, a mobile telephone switching office (MTSO) 20, base stations 30 with antenna systems and mobile subscriber units (MSUs) 40. The PSTN is made up of local networks, the exchange area networks, and the long distance network that interconnects telephones and other communication devices on a worldwide basis. The MTSO is the central office for mobile switching. The MTSO may include a mobile switching center (MSC), field monitoring, and relay stations for switching calls from cell sites to land line central offices (PSTN). The mobile subscriber unit (MSU) is the physical equipment, e.g., a cell phone having a control unit and a transceiver that transmits and receives radio transmissions to and from base stations 30.

The term "cell site" refers to the physical location of the radio equipment or base station that provides coverage within a geographic area referred to as a cell. Equipment located at a base station may include power sources, computers, interface equipment, radio frequency transmitters and receivers, and tower mounted antenna systems. Due to the high costs of obtaining a cell sites and deploying base station equipment, proper selection of cell sites to serve a target market is important to the profitability of a service provider.

The size and location of cells and the corresponding base stations vary depending upon a number of factors including signal propagation and call volume. For example, metropolitan-areas with high traffic may require more base stations operating at lower power levels due to call volume, surface clutter and interference. Less densely populated areas may be covered with fewer base stations operating at higher power levels. Desired signal penetration into buildings and vehicles must be considered. In some instances, distributed antenna systems (DAS) may be utilized to enhance coverage in buildings and other structures.

In the past, many wireless communication service providers focused primarily on geographical coverage rather than capacity utilization. These providers constructed cellular networks with base stations to achieve acceptable coverage over broad service areas. As in the case of landline service, providers relied on rate-insensitive users, typically businesses and high-income individuals, to support the cost of the infrastructure required to provide wireless communications service over relatively broad geographic areas. Service was typically concentrated on metropolitan areas and areas that served roaming traffic that was billed at higher rates.

The relatively high rates charged by such providers limited the potential market for wireless services. The rate plans were based on minutes used, the time of day calls were made, whether the calls were made on weekdays or weekends and incorporated additional charges for roaming. As more features and services became available, the rate plans were adjusted to add incremental charges for the services. As a result, rate plans became more complicated and hard to understand. Often, consumers incurred charges much higher than anticipated. Billing errors became more frequent due to the complexity of the plans. All of these factors tended to limit the market for wireless services.

In order to target price-sensitive customers and customers dissatisfied with receiving unexpectedly high monthly charges, a number of wireless service providers began to offer plans that provided a customer or consumer with a fixed number of minutes for a fixed price. Other plans, referred to as "all you can eat" have offered unlimited usage for a fixed monthly price. In order to provide these rate plans profitably, some providers shifted their focus away from broad geographic coverage to a more targeted approach to providing wireless services.

SUMMARY

In one variation of the method disclosed herein, demographic data is collected in the form of population density, household income and ethnicity factors. Each of these categories is divided up into percentile groups such that a particular range for any group is set as a category and the percentage in this group is then defined. For each of the groups in each category, there is a weighting factor that is applied to the group. The weighting factor weighs the particular category and percentile relative to the others such that the more important ranges in a given category are weighted higher than others. Thus, the weighting factors reflect the general goals or purpose of the overall infrastructure. Thereafter, a formula is determined to combine the weighted categories and percentiles to produce a factor or index. This index may then be utilized in the design of cellular infrastructure, with infrastructure investment correlated to the index. Areas having a higher index values will be the focus of the infrastructure design.

In one aspect, a method of designing physical infrastructure for a wireless cellular telephone network in a region of interest includes accessing selected demographic information in a plurality of categories for a plurality of discrete geographic areas in the region of interest and the distribution of values in each category for the region. The distribution is divided into a predetermined number of discrete percentile ranges and a weighting factor is determined for each percentile range. In this regard, the value of the weighting factor may be determined by the largest number of discrete percentile ranges in any one category. A category weight is determined for each category for the region of interest. The weighting factor for each category for each of the discrete geographical areas in the region of interest is multiplied by category weight for that category. The products of the weighting factors and category weights are summed for each of the discrete geographical areas to determine a demographic index for each of the areas in the region of interest. The demographic indices are then displayed.

Thus, in one variation, a Demographic Index ("DI") represents a combination of different census data combined into a single value that can be mapped and evaluated. Mapping the DI provides a powerful and efficient wireless network design tool. The DI based infrastructure design method disclosed herein is simpler and more efficient than traditional wireless design techniques based on population and coverage uniformity. A properly employed DI based design permits a cellular provider to select and deploy infrastructure assets to optimize capital allocation and capacity utilization. Similarly, the DI allows a wireless provider to direct and focus advertising to customers in the target market. The DI can be used also to determine sales penetration in connection with existing infrastructure.

In one aspect, the results of the DI analysis are presented in the form of a thematic map. Thematic maps sometimes referred to as statistical or special purpose maps, display a spatial pattern of one or a series of attributes. In contrast to reference maps that may show geographic features, e.g. forests, roads, political boundaries, thematic maps emphasize spatial variation attributes in one or a number of geographic distributions. These distributions may be physical phenomena such as climate or human characteristics such as population density and health issues. These types of maps are sometimes referred to as graphic essays that portray spatial variations and interrelationships of geographical distributions. Thematic maps created with DI values for discrete geographical areas may be utilized to delineate target areas for service coverage. The target areas may be used as a tool to design and deploy infrastructure for a cellular system, i.e., to determine the number of sites and/or site density, the equipment used at base stations at different sites and the location of direct sales stores and/or service centers.

As disclosed herein, a method of designing and deploying physical infrastructure to support a cellular telephone network includes selecting a region of interest and accessing selected demographic information in a plurality of categories for a plurality of discrete geographic areas in the region. As used herein a "region of interest" refers to a geographic area including areas wherein a cellular provider may wish to deploy infrastructure to provide wireless communication services.

The distribution of values in each category, for example population density, income and race, for the region of interest is accessed or calculated and divided into a predetermined number of discrete percentile ranges. A weighting factor for each percentile range is determined. In one variation, the values of the weighting factors are equal to the largest number of discrete percentile ranges in any of the selected categories, plus one. In another variation, the values of the weighting factors are proportional to the largest number of discrete percentile ranges in any of the selected categories. A category weight is determined for each category and multiplied by the weighting factor for each of the discrete geographical areas in the region of interest. The products of each category weight and weighting factor are summed for each of the discrete areas to determine a DI for each of the areas. Physical infrastructure is then designed and deployed in the region of interest based on demographic index values for the discrete geographical areas. In one aspect, the categories include population density, income and ethnicity. In another, the discrete geographical areas are census blocks.

In one aspect, the infrastructure is one or more cellular base stations deployed at a location or locations in the region of interest based on the demographic index values for the discrete geographical areas. In another, the infrastructure includes one or more direct sales stores and/or service centers deployed at locations in the region of interest.

In another variation, a system for designing infrastructure for a cellular system includes a processor configured to access demographic data in a plurality of different categories for a plurality of discrete geographical areas in a region of interest from a database and to determine an index value for each of the discrete geographical areas based upon the demographic data. The system further includes a data communications interface connected to the processor and configured to transfer demographic data from the database to the processor and to transfer data from the processor to a display device. The processor may be configured to map the index value for each of the discrete geographical areas using a display device connected to the processor via the data communications interface.

The map may be a thematic map and the processor may be configured to map target areas onto the thematic map and display the thematic map with the mapped target areas using the display device via the data communications interface. The processor may be further configured to access propagation data and identify base station sites within the target area to provide a minimum, pre-selected signal strength within the target area.

In one embodiment, a wireless cellular communications system includes a plurality of base stations for providing wireless cellular communications to subscribers in selected target areas wherein base stations are located by accessing, with a computer, a database of demographic data in a plurality of selected categories for discrete geographical areas in a region of interest. Weighting factors for ranges of values in each category of demographic data are determined and, for each discrete geographical area in the region of interest, the weighting factor for each category of demographic data for that discrete geographical area is determined. A category weight factor for each category of demographic data is determined and applied to the weighting factors for each category of demographic data for each of the discrete geographical areas in the region of interest to obtain a category value. The category values are combined to obtain a demographic index value for each of the discrete geographical areas in the region of interest. The target areas within the region of interest are determined based upon the demographic indexes of the discrete geographical areas wherein the target areas are selected to encompass those discrete geographical areas having demographic index values within a predetermined range. The base stations are located to provide cellular communications services to subscribers in the target areas. The base stations may be configured to provide a minimum strength in the target areas or to provide different minimum strengths in different parts of the target areas.

In one variation, the discrete geographical areas comprise census blocks and the categories comprise population density, race and income wherein race is defined as the white percentage of the population. In one variation category weighting factors are 0.4 for population density, 0.35 for median income and 0.25 for race; in another, the category weighting factors are 0.6 for population density, 0.3 for median income and 0.1 for race. Communications services provided by the wireless communications system may be offered to subscribers of the system for a flat rate for unlimited use of the system or a flat rate for a predetermined number of minutes.

In another embodiment, a wireless cellular communications system provides wireless communications to subscribers in a geographical area having a demographic index between about 3.5 and 6.0. The demographic index is calculated as the sum of the products of category factors and category weighting factors for census blocks in the geographical area. In one aspect, the category weighting factors are 0.6 for population density, 0.3 for median income and 0.1 for race, race being defined as the white percentage of the population. Population density weighting factors are 0 for a density of less than 1500, 2 for a population-density from 1500 to 3500, 3 for a population density from 3500 to 4900, 4 for a population density from 4900 to 7000 and 6 for a population density greater than 8000. Income distribution weighting factors are 5 for a median income of less than $31,000, 6 for a median income of from $31,000 to $40,000, 6 for a median income of from $40,000 to $50,000, 4 for a median income of from $50,000 to $67,000, 3 for a median income of from $67,000 to $80,000 and 0 for a median income greater than $80,000. Race distribution weighting factors are 6 for less than 48% white, 5 for from 48% to 69% white, 3 for from 69% to 82% white, 1 for 82% to 91% white and 0 for 91% to 100% white; and wherein the wireless cellular communications system includes a plurality of base stations for providing wireless communications to subscribers of the system in the geographical area. In another variation, the category weighting factors are 0.4 for population density, 0.35 for median income and 0.25 for race. In another aspect, the demographic index of the geographical area is at least 4.5.

BRIEF DESCRIPTION OF THE DRAWINGS

The patent or application file contains at least one drawing executed in color. Copies of this patent with color drawings will be provided by the Patent and Trademark Office upon request and payment of the necessary fee. For a more complete understanding, reference is now made to the following description taken in conjunction with the accompanying Drawings in which.

DETAILED DESCRIPTION

Figure 1:
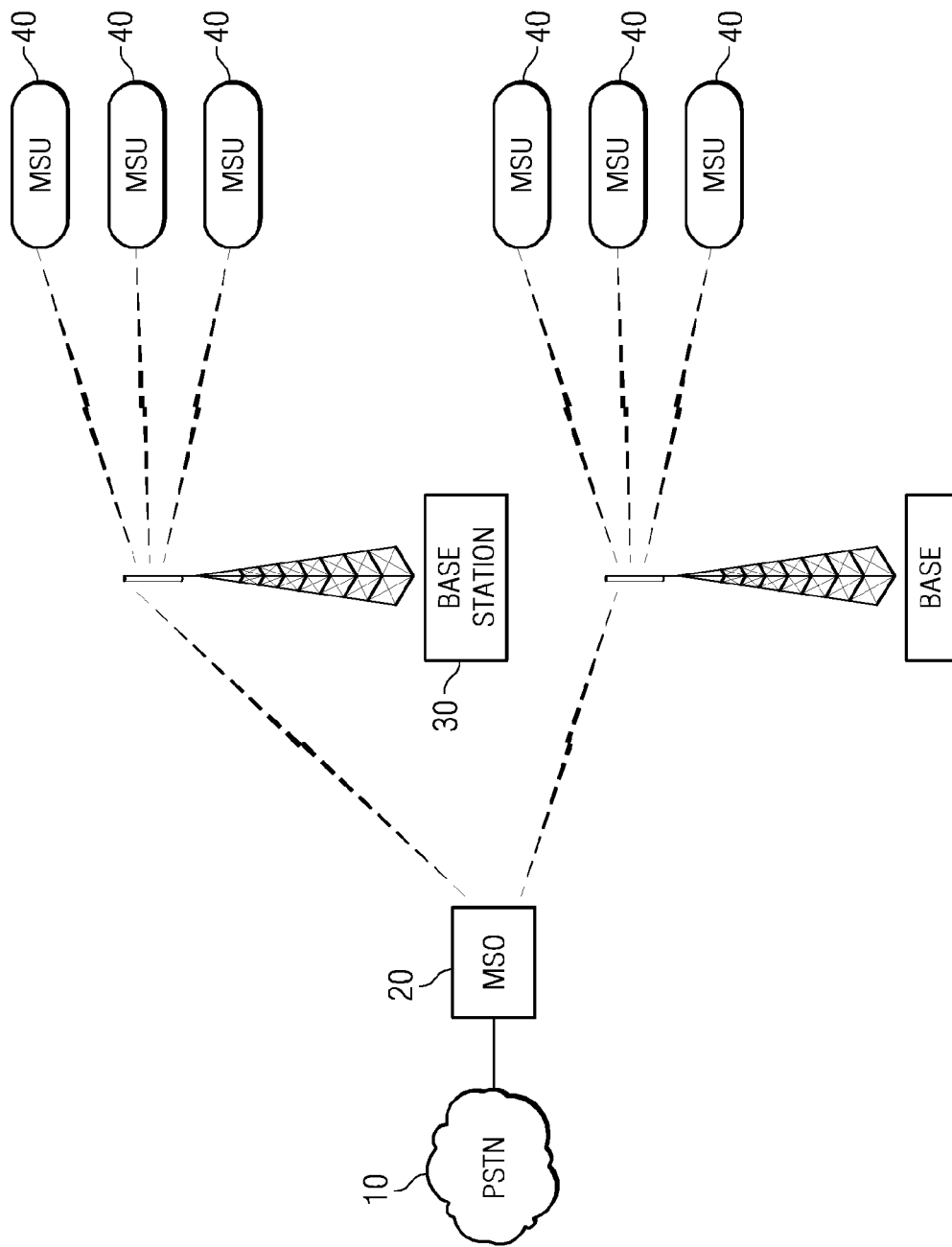
FIG. 1 illustrates typical components of a cellular system.

Referring now to the drawings, wherein like reference numbers are used herein to designate like elements throughout the various views, embodiments are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

One goal in designing cellular infrastructure is to place towers and/or base stations where large amounts of traffic exist, or will exist, to serve a target market. Thus, when designing a cellular telephone system to serve a broad range of users, including price-sensitive users, factors other than signal propagation and geographic coverage must be considered. In addition to base stations and one or more mobile switching offices, a cellular provider may have additional infrastructure requirements such as repeaters and distributed antenna systems (DAS) and DAS nodes. Additional infrastructure may include direct sales offices and service centers operated and leased or owned by the provider. The provider may also use indirect (third party) vendors to market its equipment and plans. The provider may utilize signage such as billboard advertising and advertisements through various media, e.g. direct mailing, newspapers, magazines, television and radio advertisements to market its services to target customers. In order to use available capital effectively, a cellular provider must locate infrastructure such as cell sites, sales offices and/or service centers to best serve the target customers. Similarly, advertising must be directed to reach the target customers.

One of the more important factors in planning and designing cellular infrastructure is the current population density and the anticipated population density for a particular area of interest. For this purpose, demographics are utilized that define population density in areas of interest. Other factors that characterize the population, including household income, age, education and ethnicity may also be considered. Population density figures and other factors typically are generated for a census "block" or "tract" wherein individual blocks of a predetermined size are defined and the population within that block determined through census figures. Census blocks are typically small, compact areas usually bounded by streets, railroads, water or other prominent physical features, as well as boundaries of legal areas, such as property lines and city limits, for which the a census bureau or other entity tabulates data. In the United States, census blocks generally have between 1,500 and 8,000 people, with an optimum size of 4,000 people. Counties with fewer people may have a single census tract. When first delineated, census tracts were designed to be homogeneous with respect to population characteristics, economic status, and living conditions. The spatial size of census tracts varies widely depending on the density of settlement. Census tract boundaries were set with the intention of being maintained over many decades so that statistical comparisons can be made from one census to the next.

However, census figures are provided only on an occasional basis, such as every five or ten years. Thus, a certain degree of speculation has typically been required in order to design a cellular system based solely on census data. Since the cost a cellular tower and related equipment is very high, if a cellular tower is located to cover a cell in a region having a future decrease in population density and/or a decrease in the target market population, it may be underutilized. The same is true of other infrastructure, for example sales offices and/or service centers.

In accordance with one variation of the method disclosed herein, a Demographic Index ("DI") blends multiple types of census data into a combined index that can be mapped, sorted, and evaluated quickly. Using one index reduces the complexity normally associated with analyzing multiple data sources. Thematically mapping the DI provides a powerful and efficient wireless network design technique. The DI based design technique disclosed herein is superior when compared with traditional wireless design methods which focus strictly on population and outdoor coverage uniformity. A properly employed DI based design allows an operator to efficiently place base stations and other assets to achieve maximum capacity and quality with a minimized roll-out cost. The DI based system design also allows greater speed to market in selected coverage areas.

In addition to placing base stations, the DI may be used to locate and design other infrastructure to support a wireless provider. For example, the DI may be used to determine locations for direct sales stores and service centers. The DI may be used to determine desirable locations for indirect (third-party) vendors. The DI may be used to as a means of focusing marketing activities such as direct mail promotions and billboard advertising to reach a target group such as price-sensitive consumers. Since the DI is generated for relatively small blocks, it can be more effective for focusing advertising and for locating stores, service centers and dealers than data generated for larger areas such as zip code data.

Formulating the DI model for a region of interest is a multi-step process in which selected demographic data is accessed, weighted and blended. An example DI model with sample data is described below for reference. In the example set forth below, the DI is created using four main data sets including:

Demographic Categories—population density, household income, ethnicity background;
Percentiles—based on a breakpoints or simple percent distributions for each category;
Weighting Factors—integer number normally ranging from 0 to 6 assigned to each percentile; and
Category weights—percent value assigned to each category based on importance.

In one embodiment, the DI model for a region of interest is formed using a combination of census data including population density, household income, and racial/ethnic background. The concept of the DI may be applied to any available statistic in the census data; however, the factors of population density, household income and ethnicity are considered important to wireless network design. In one variation, the DI is calculated based on data for census block or tracts delineated by the United States Census Bureau. Each block is a defined geographic region having known population, income, and ethnicity data that is needed to create a DI model for the area. Census data for each block in a region of interest is first accessed for the geographic area or areas of interest. This data is may be imported into an application program such as a spreadsheet and analyzed based on statistical breakpoints and percentiles.

Percentiles and breakpoints for each category of demographic data may be set based on the target market. Local knowledge of the target market combined with sales and marketing input may be used to determine the percentiles and breakpoints used in the DI model. Each percentile range for each demographic category is assigned a non-linear weighting factor. In one variation, the largest weighting factor is determined by the largest number of percentiles used to divide any of the selected categories. Tables 1, 2, and 3 illustrate the percentiles used in the Dallas, Tex. area DI formulation. For this example, the household median income category was divided into six percentile ranges leading to a maximum weighting factor assignment of six for all categories. The example presented below also demonstrates the non-linear weighting factor assignments. Weights from 0 to 6 are assigned to each percentile and not all numbers are used.

TABLE 1

Population Density Distribution and Factor Assignment

| Population Density (POPs/sq mile) | % Distribution | Factor-POP Den |
|---|---|---|
| 0-1500 | 20 | 0 |
| 1500-3500 | 20 | 2 |
| 3500-4900 | 20 | 3 |
| 4900-7000 | 20 | 4 |
| 7000-81600 | 20 | 6 |

TABLE 2

Household Income Distribution and Factor Assignment

| Median Household Income ($$) | % Distribution | Factor-Income |
|---|---|---|
| 0-31K | 28 | 5 |
| 31K-40K | 22 | 6 |
| 40K-50K | 19 | 6 |
| 50K-67K | 15 | 4 |
| 67K-80K | 6 | 3 |
| 80K-400K | 10 | 0 |

TABLE 3

Racial Background Distribution and Factor Assignment

| Percent White Race | % Distribution | Factor-Race |
|---|---|---|
| 0%-48% | 20 | 6 |
| 48%-69% | 20 | 5 |
| 69%-82% | 20 | 3 |
| 82%-91% | 20 | 1 |
| 91%-100% | 20 | 0 |

After the distribution of category values, breakpoints and percentiles have been determined; the next step in developing the DI model involves weighting the above categories. The same process to develop the percentiles and weighting factors can be applied to the category weighting percentages. That is, available market information for the region of interest and characterizing factors of the target market may be used to select category weights. Table 4 illustrates two different category weighting models or schemes. The 60-30-10 weighting model uses population density as the primary component of the DI, while the 40-35-25 more evenly distributes the weight or importance assigned to each of the three categories used in the model.

TABLE 4

Category Weighting Assignment

| Categories | 60-30-10 Weights | 40-35-25 Weights |
|---|---|---|
| Population Density | 60% | 40% |
| Median Household Income | 30% | 35% |
| Percent White Population | 10% | 25% |

Thus, the DI model can be constructed once the categories, percentiles, weighting factors, and category weights are defined. A 60-30-10 DI model would be defined as the following:

$$DI=(0.60)*(\text{Factor-POP Den})+(0.30)*(\text{Factor-Income})+(0.10)*(\text{Factor-Race})$$

Similarly, a 40-35-25 DI model would be defined as the following $$DI=(0.40)*(\text{Factor-POP-Den})+(0.35)*(\text{Factor-Income})+(0.25)*(\text{Factor-Race}).$$

Figure 2:
FIG. 2 is a thematic mapping example of a demographic index for the Dallas, Tex. area.

Each of the above DI calculations is applied to every census block in the design area or region of interest. In this example, each DI calculation results in a decimal number between 0 and 6 for each census block in the region of interest. The DI values for the census blocks may then be mapped using color gradients representing DI values or ranges of DI values between 0 and 6. An example of a 60-30-10 DI thematic map for Dallas, Tex. area is shown in FIG. 2. Once the DI for each census block is thematically mapped, specific target areas may be easily identified and focused wireless network design may begin. Additional DI weighting can be applied and correlations between different DI's can be used to create target area polygons that may be used to locate infrastructure such as base stations and direct sales stores.

Figure 3:
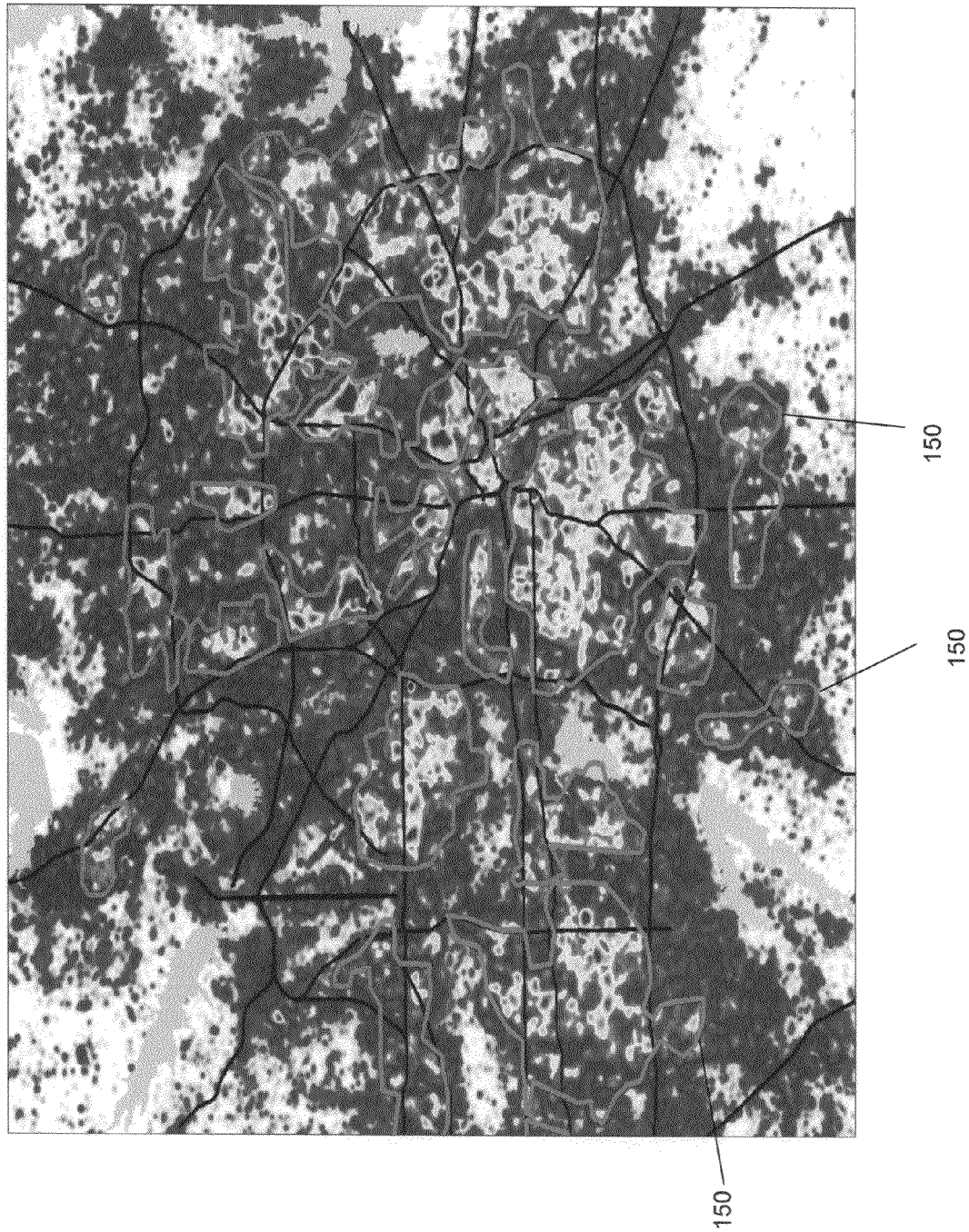
FIG. 3 is a diagrammatic view of the map of FIG. 2 illustrating the correlation between actual use and the designed use after a period of time.

FIG. 3 illustrates a February 2007 Erlang traffic map of a DFW network approximately eleven months after the network was launched. The traffic intensity levels increase based on the following color progression—White, Blue, Red, Yellow and Purple. Areas with significant yellow and purple are the highest traffic concentrations. The green polygons are target areas developed in May 2005 using the Demographic Index. The correlation between live network traffic and target areas is readily apparent, validating the use of the DI model as a design tool for locating infrastructure.

According to one aspect, the method includes defining the particular demographic information that is relevant to designing a particular infrastructure for a particular market. If, for example, the target market is corporate and business clients, an education factor may be incorporated into the model. For an application in which fixed rate cellular telephone service is to be marketed, the target market would include mid to lower income individuals, with less emphasis or importance assigned to high income earners. For example, in Table 2 median household income in the range from $80K-$400K is weighted a "0" and the $31K-$50K range is assigned a weight of "6," the highest weighting used in the model.

For population density, the highest weighting value would be assigned to blocks having the highest population density. The ethnicity factor, based on various studies, indicates that the highest weighting is between 0%-48% white. These weighting factors, based primarily upon market analysis, are developed for specific marketing goals for a cellular system in a region of interest. Other factors may be used depending upon the particular goals for a system and infrastructure. For example, if the goal is to target businesses and commercial customers, then another demographic such as the location of industrial facilities or commercial offices may be required. For the purposes of the example, in some cases the percent distribution is a function of the selected demographic tables.

Once the DI has been determined for each census block, the designer may begin the process of distributing the focus of the infrastructure onto a particular target area or areas. The greater the higher the DI factor, the greater the focus. For example, if the DI is in the range of from 4.5 to 6, this value will correlate to the amount of infrastructure that is or will be dedicated to a particular area to serve the target market. Such infrastructure may include base stations, direct sales stores and service centers. Other predetermined ranges of DI values may be also be used to identify target areas.

Figure 4:
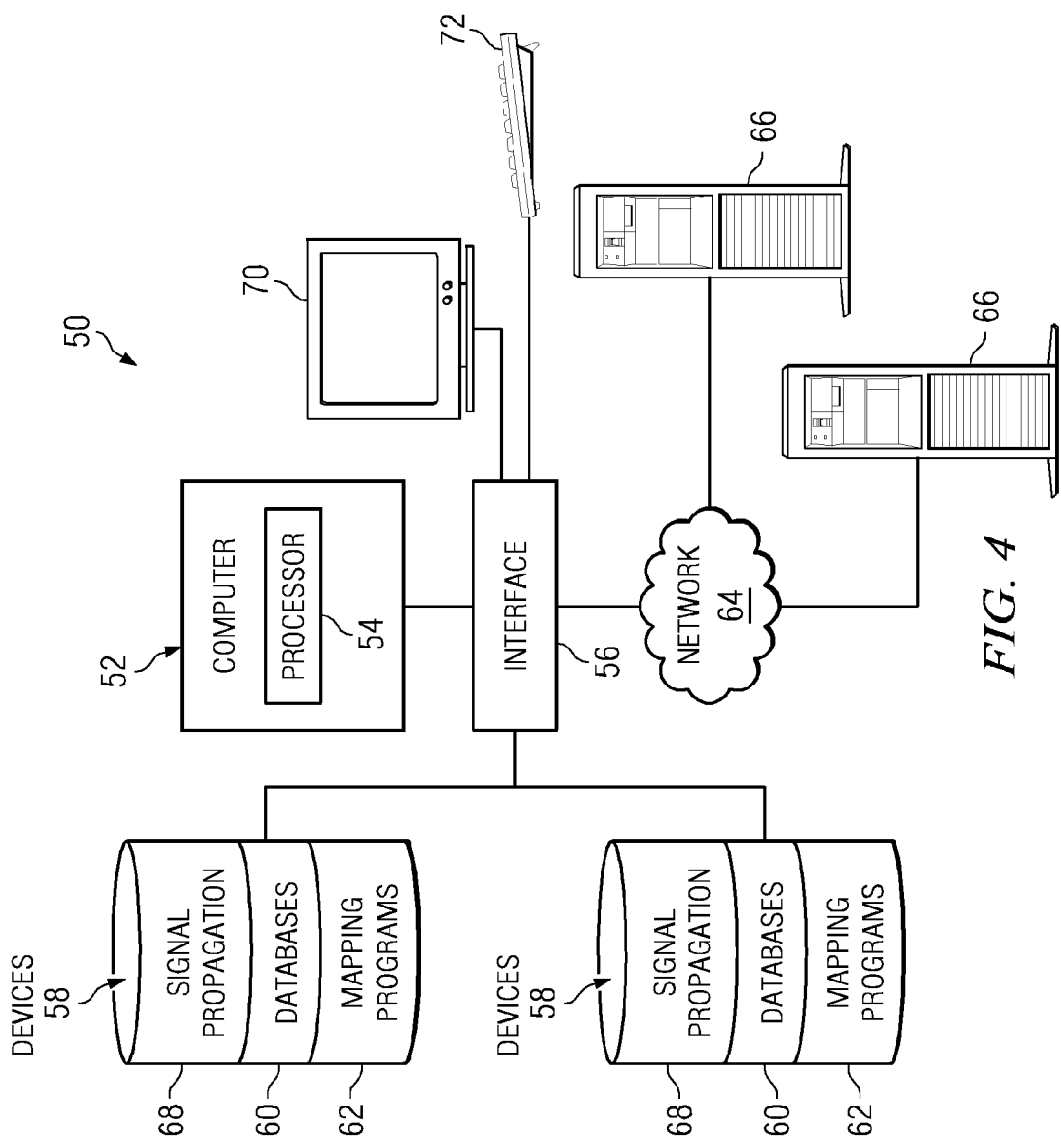
FIG. 4 is a schematic representation of a system for implementing the method disclosed herein.

Referring to FIG. 4, in one variation, a system for implementing the method disclosed herein comprises a mapping engine 50 including a computer 52 having a processor 54 and a data communications interface 56. Processor 54 communicates via communications interface 56 with one or more data storage devices 58 having one or more databases 60 for storing data such as demographic information as well as mapping programs 62. Processor 54 may also be linked via communications interface 56 with one or more public or private networks 64 to access data and application programs such as signal propagation data 68 and mapping programs resident on remote servers 66. A data input device 72 such as a keyboard is provided to enable an operator to provide instructions and information to processor 54 via data communications interface 56. A conventional display device such as a color monitor connected to processor 54 via interface 56 enables processor 54 to display information to the operator.

In one variation, processor 54 is configured to receive demographic data in a plurality of different categories for a plurality of discrete geographical areas such as census blocks in a region of interest from one or more of databases 60 and to determine a demographic index for each of the discrete geographical areas based upon the demographic data. Data communications interface 56 is configured to transfer demographic data from one or more of databases 60 to the processor and to transfer data from processor 54 to a display device 70. The demographic index values may be displayed in the form of a data table or a map. In a preferred embodiment, processor 54 is configured to map the demographic index values in the form of a thematic map and display the map on display device 70. The processor may also be configured to access propagation data for the target areas and identify base station sites within the target area to provide a minimum, pre-selected signal strength within the target area.

Figure 5:
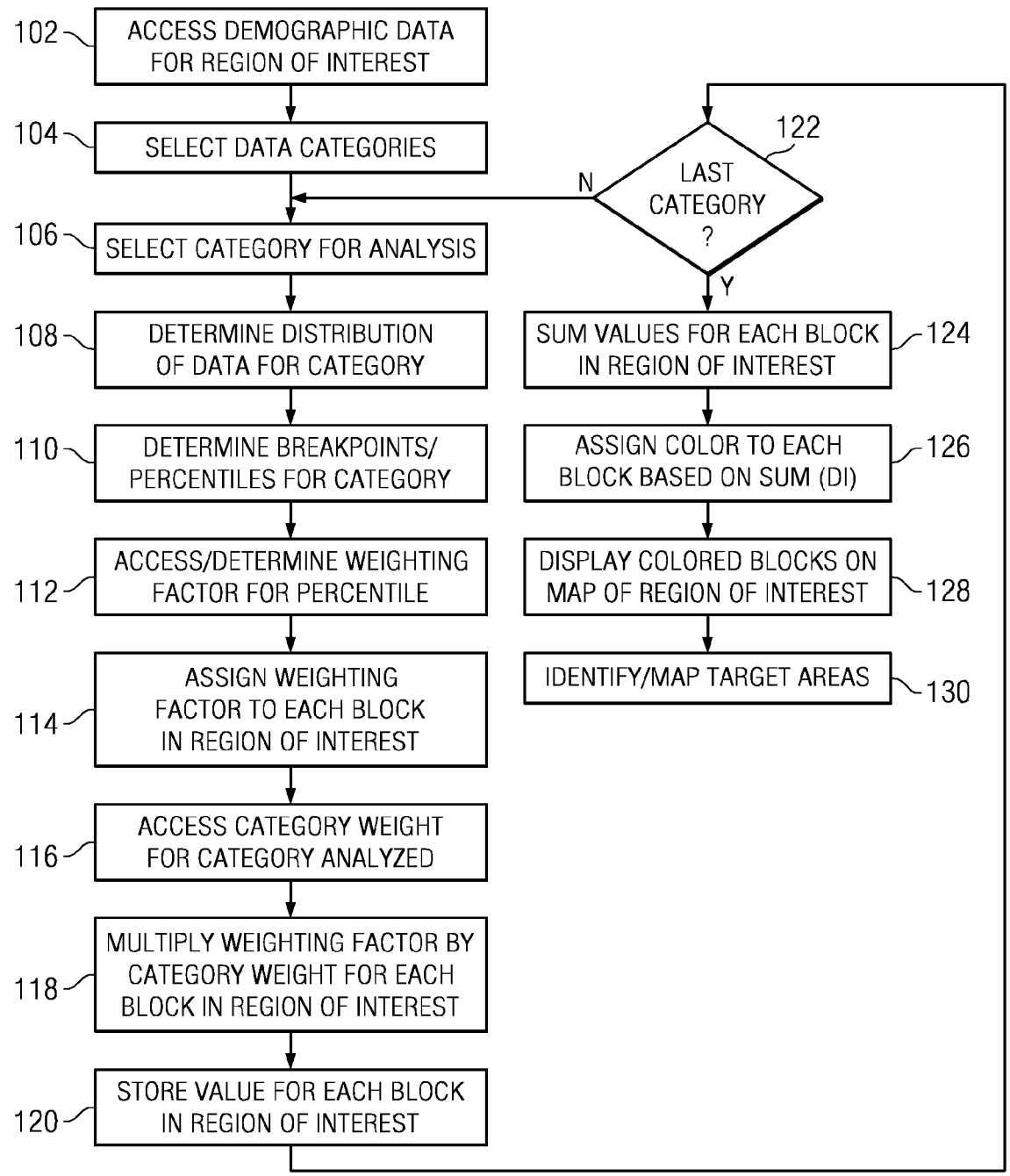
FIG. 5 is a flowchart of a method for determining demographic indexes for a plurality of blocks in a region of interest.

FIG. 5 is a flowchart of one computer-implemented method of creating a DI for a region of interest using engine 50. The first step in the method is to access demographic data for discrete geographic areas or blocks in the region of interest (Step 102). The demographic data may include one or more of the population or population density of the block, household income, ethnicity, average age of residents, number of children, education level and other information of interest. The data may be resident in a database 60 or may be accessed via network 64 from a third party source that maintains the data on servers 66. Once the data is available for analysis, the categories of interest are determined (Step 104). In one variation, the data for the selected categories is loaded into a spreadsheet program for analysis. In the above example, the selected categories are population, household income and ethnicity.

The first category of interest to be analyzed is selected (step 106) and the distribution of the category is determined for the region of interest (Step 108). If the distribution is not part of the demographic data accessed in step 102, it may be calculated using the data for individual blocks in the region of interest. The breakpoints and percentile ranges for the category are then input or accessed (Step 110). The breakpoints may be based on percentages of the distribution or on other factors. In the above example, the population density and ethnicity breakpoints each correspond to 20% increments of the distribution. Alternatively, factors such as knowledge regarding the location and its population along with input based on marketing considerations may be used to set the breakpoints. In the above example, the median household income is divided into ranges of interest, e.g., 0-31K, 31-40K, 40-50K, 50-67K, 67-80K and 80-400K, and the percentiles for the ranges are determined based on the distribution in the region of interest. In some variations, the data may be tabulated as accessed and the breakpoints for the percentile ranges selected to correspond to percentile ranges or breakpoints of the tabulated data.

The weighting factor to be applied to each percentile range is then assigned to each range (Step 112). The weighting factors may be input for each analysis and/or preprogrammed. In one variation, the weighting factors correspond to the maximum number of percentiles into which the data is divided plus one. For instance, in the above example, median household income is divided into six percentiles or percentile ranges. Consequently, the weighting factors are 0, 1, 2, 3, 4, 5 and 6. As illustrated in the example, the weighting factors are not necessarily applied in a linear manner. For example, in the case of median household income, the factors 1 and 2 are not used. Similarly, the factor 1 is not used for population density. Other weighting factors proportional to the maximum number of percentiles used to divide any category could be used. For example, the weighting factors may be multiples of the numbers of the percentile ranges, e.g. 0, 2, 4, 6, 8, 10 and 12. Other variations wherein the weighting factors are proportional to the number of percentile ranges are possible. In other variations 0 may be omitted as a weighting factor such that the lowest weighting factor is 1.

After the weighting factors have been determined or accessed, a weighting factor for the category is assigned to each block in the region of interest (Step 114). In the above example, a block in which the population density is between 3500 and 4900, would be assigned a weighting factor of 3. The category weight is then accessed (Step 116) and multiplied by the weighting factor for the block (Step 118). In the example, two category weight models are used to characterize the relative importance of population density, income and ethnicity: a 60-30-10 model and a 40-35-25 model. Thus, using the 60-30-10 model, a block is assigned a weighting factor of 3 for population density would be multiplied by a category weight factor of 0.60 resulting in a category value of 1.8 for that block. The weighting factor for each block in the region of interest is multiplied by the category weight for that category and the results, e.g. category values are stored (Step 120). If any of the selected categories (population density, income or ethnicity) are deemed to have more or less importance in view of the target market, the model may be adjusted accordingly. Depending upon the target market, if other categories such as age or education are deemed important, these categories may be added to the model.

The process is repeated for each category (step 122) until values for the product of the each category weight multiplied by the category weighting factor for each block in the region of interest have been calculated and stored. In the example, three category values corresponding to population density, income and ethnicity will be stored for each block in the region of interest. The category values for each block are summed to obtain a final weighted value, the DI, for each block (Step 124). If the DI values are to be represented in the form of a thematic map, a commercially available mapping program may be used to assign an attribute such as color to each DI value (Step 126) and the colors for each block in the region of interest are displayed or printed on a map of the region of interest. FIG. 2 is an example of such a map prepared for the Dallas, Tex. area. Based on the mapped DI values, target areas including those blocks having a DI in a predetermined range may then be easily identified and/or mapped (Step 130).

Figure 6:
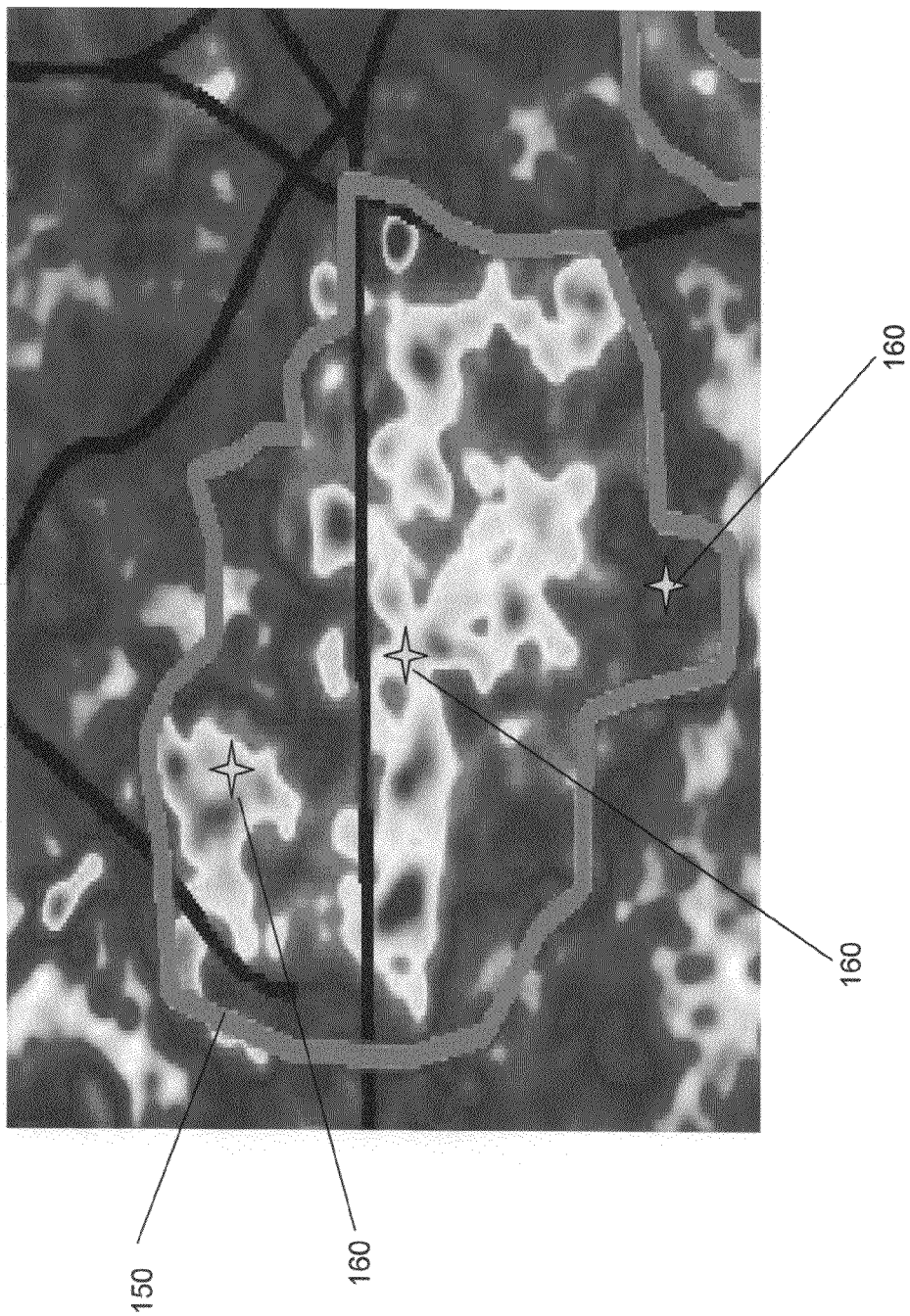
FIG. 6 is an enlarged portion of the map of FIG. 3 illustrating hypothetical infrastructure locations.

Thus, based on the DI for the individual census blocks, target areas for cellular coverage can be determined. Commercially available mapping software may be used to delineate target areas on a thematic map such as illustrated in FIG. 2. For example, FIG. 3 is a map of the Dallas, Tex. area with target areas 150 generally corresponding to those census blocks having a DI above a predetermined threshold level or within a predetermined range. Once the target areas are defined, the cellular system designer may begin the process of designing the system. The system designer may use signal propagation and/or clutter maps to determine the location and number of base station sites and the equipment and antenna systems required to provide the desired signal propagation within the target area. The system designer may also use the target area boundaries in conjunction with other data to determine the placement and configuration of distributed antenna nodes (DAS) and any other equipment to provide communication service in the target areas. For example, referring to FIG. 6, an enlarged portion of FIG. 3, in one hypothetical, the designer may choose to locate base station sites 160 at the indicated locations to provide coverage for the target area 150.

In one variation, the boundaries of target areas 150 may correspond generally to the boundaries of the census tracts encompassed in the target area. However, geophysical data may be used in conjunction with DI values to modify target areas 150. For example, if a given census tract having a high DI also includes an uninhabited area such as a lake, a park or other uninhabited or uninhabitable area, the boundaries for the target area may be adjusted to exclude the uninhabited area or areas from the target area.

Some areas or blocks in a region of interest may incorporate special purpose facilities that will have low DI values but generate but generate a high volume of cellular traffic. For example blocks including airports, train and bus stations and highly traveled commuter routes may have low DI values since few people reside in such locations. However, a large number of airport employees, transportation workers and travelers may have and use cellular communication services. Consequently, it may be necessary to adjust target area boundaries to incorporate special purpose facilities such as airports, train and bus stations and commuter routes.

In another variation, geophysical information is used to increase the resolution of the DI based model. In some instances, a census tract may include both unpopulated areas as well as highly populated areas. For example, if a census tract includes a lake, a park or industrial sites in conjunction with a concentration of a population comprising a target market in a small area such as an apartment complex, the weight accorded a factor for the particular census tract may be skewed. In order to compensate for such variations, the weighting factors applied to the census data for the particular census tract may be adjusted according to the geophysical data.

In one embodiment, if geophysical data reveals that a census tract includes a large unpopulated area, population density may be adjusted by multiplying the weighting factor for census population data for the tract by a factor equal to the total area of the tract divided by the populated area or by the inverse of the percentage of habited area in the census block. For example, according to the above example, a census block having a population density of from 1500-3500 would normally be assigned a weighting factor of 2. However, it geophysical data shows the particular census block is 60% uninhabited swamp land, the weighing factor may be multiplied by a factor of $1/0.6$ or 1.66 to obtain a value of approximately 3.3. In this variation, the target areas 150 selected based on adjusted DI values for census tracts may more closely match the target criteria selected. If the modified data for the census tract is used to construct a thematic map with target areas 150 such as illustrated in FIG. 3, the boundaries of the target areas may be modified to correspond to the area or areas of the tract where the target population resides.

In another embodiment, rather than using geophysical information to modify the DI calculation for blocks, the target area boundaries may be moved or adjusted to exclude or compensate for uninhabited areas such as lakes, parks or industrial sites in conjunction. In this variation, after the DI has been used to identify and map target areas, the mapping program is utilized to adjust the boundaries of target areas in the region of interest to exclude known uninhabited areas or otherwise adjust the boundaries of the target areas.

Census blocks or tracts vary in size, geographical features and land use. Consequently, census blocks may include a variety of clutter, i.e., obstacles or surface characteristics such as variations in surface elevation, buildings and forested areas that can interfere with or block radio frequency signals between a base station and a mobile subscriber unit. Clutter and signal propagation data and maps are available from a variety of sources, for example PlanetEV from Mentum. In one variation, geodata such as signal propagation and clutter maps and data may used in connection with DI values to adjust target area boundaries between various type of clutter to facilitate placement of infrastructure such as base stations and distributed antenna systems to enhance coverage of a target area. For example, high clutter areas within a block or blocks may be separated by target area boundaries such that the areas will be served from different directions by different base stations. Distributed antenna systems may also be employed to provide coverage for the areas.

The DI may also be used to select antenna systems and other equipment for base systems. Limited available site locations, surface clutter and surface topology may require less than optimum base station location. In such cases, omnidirectional antenna systems may not be practical or useful. In such instances, sector, or directional antenna systems may be used to provide coverage for target areas. Transmission power levels may be determined using signal propagation maps in conjunction with target areas determined using DI values to achieve selected minimum signal strengths in the target areas.

In another embodiment, the DI model may be used to determine sales penetration in target areas. Since the DI model reflects the characteristics of the target market, the target areas created using the DI model indicate the location of the market. Overlaying or mapping call volumes onto target areas as illustrated in FIG. 3 illustrates the level of sales penetration in the target areas. In the case of target areas where the level of sales penetration does not match the expectations based upon the DI values for the area, additional marketing efforts may be directed to the target areas. Such marketing efforts may include additional signage, direct mail advertisements, placing direct sales stores and/or service centers within the target areas, and/or increasing the number of vendors (indirect sales). Newspaper, television and radio advertisements and incentives directed to the target market may be focused on the target areas where sales penetration is below expectations based on the DI model.

It will be appreciated by those skilled in the art having the benefit of this disclosure that provides a method and system for designing and deploying infrastructure for a cellular system. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of designing physical infrastructure for a wireless cellular communications network in a region of interest comprising:
   accessing, with a computer, a database of demographic data in a plurality of selected categories for discrete geographical areas in the region of interest;
   determining a separate weighting factor for each of a plurality of substantially, non-overlapping ranges of values within each category of the demographic data and, for each discrete geographical area in the region of interest, determining the separate weighting factor for each of a plurality of substantially, non-overlapping ranges of values for each category of demographic data for that discrete geographical area;
   determining a category weight factor for each category of demographic data and applying the category weight factors to the separate weighting factors for each category of demographic data for each of the discrete geographical areas in the region of interest to obtain a category value and combining the category values to obtain a demographic index value for each of the discrete geographical areas in the region of interest;
   determining target areas within the region of interest based upon the demographic indexes of the discrete geographical areas, wherein the target areas are selected to encompass those discrete geographical areas having demographic index values within a predetermined range; and
   identifying cellular sites and equipment to provide service to the target areas.

2. The method of claim 1 wherein the categories comprise population density, race and income.

3. The method of claim 1 wherein the discrete geographical areas comprise census blocks.

4. The method of claim 3 further comprising displaying the demographic indices for each of the discrete geographical areas as a thematic map of the region of interest and wherein the step of determining target areas comprises delineating those discrete geographical areas having demographic index values within a predetermined range on the thematic map.

5. The method of claim 4 further comprising using signal propagation data for the region of interest to determine sites for base stations within the target areas.

6. The method of claim 1 further comprising using geophysical data to change the target areas to exclude uninhabited areas from the target areas.

7. The method of claim 1 further comprising changing the boundaries of the target areas to include special purpose facilities.

8. The method of claim 1 further comprising deploying physical assets within the target areas to provide cellular wireless services within the target areas.

9. The method of claim 8 wherein the physical assets comprise one or more of base stations, distributed antenna systems, and direct sales stores.

10. A method of designing physical infrastructure for a wireless cellular telephone network in a region of interest comprising the steps of:
    accessing selected demographic information in a plurality of categories for a plurality of discrete geographic areas in the region of interest;

accessing the distribution of values in each category for the region of interest;

dividing the distribution into a predetermined number of discrete percentile ranges;

determining a weighting factor for each discrete percentile range, wherein the value of the weighting factors is determined by the largest number of discrete percentile ranges in any one category;

determining a category weight factor for each category for the region of interest;

for each discrete geographical area in the region of interest, multiplying the weighting factor for the discrete geographical area by the category weight for that category;

summing the products of each weighting factor and each category weight to determine a demographic index value for each discrete geographical area in the region of interest; and displaying the demographic index value for each discrete geographical in the region of interest.

11. The method of claim 10 further comprising the step of deploying physical infrastructure at a location within the region of interest based on the demographic index values for the discrete geographical areas.

12. The method of claim 11 wherein the step of positioning physical infrastructure at a location within the region of interest further comprises deploying a cellular base station at a location in the region of interest based on the demographic index values for the discrete geographical areas surrounding the infrastructure.

13. The method of claim 11 wherein the step of positioning physical infrastructure at a location within the region of interest further comprises locating a store at a location in the region of interest based on the demographic index values for the discrete geographical areas surrounding the infrastructure.

14. The method of claim 11 wherein the step of positioning physical infrastructure at a location within the region of interest further comprises placing a service center at a location in the region of interest based on the demographic index values for the discrete geographical areas surrounding the infrastructure.

15. The method of claim 10 wherein the categories include population density, income and ethnicity.

16. The method of claim 15 wherein the category weight factors decrease in the order of population density, income and ethnicity.

17. The method of claim 10 wherein the weighting factors are integers from zero to the largest number of discrete percentile ranges in any one category, plus one.

18. The method of claim 10 further comprising selecting a cell site based upon the demographic index value for census blocks in the region of interest.

19. The method of claim 10 wherein the step of displaying the demographic index value for each discrete geographical area comprises displaying the demographic index for each discrete area as a thematic map of the region of interest.

20. The method of claim 10 further comprising mapping target areas on the thematic map, the target areas having a demographic index values within a predetermined range.

21. A system for designing infrastructure for a cellular system, system comprising:

a processor configured to access demographic data in a plurality of different categories for a plurality of discrete geographical areas in a region of interest from a database and to determine an index value for each of the discrete geographical areas based upon the demographic data, wherein the processor is configured to determine the index value by:

determining a weighting factor for each discrete percentile range, wherein the value of the weighting factors is determined by the largest number of discrete percentile ranges in any one category;

determining a category weight factor for each category for the region of interest;

for each discrete geographical area in the region of interest, multiplying the weighting factor for the discrete geographical area by the category weight for that category;

summing the products of each weighting factor and each category weight to determine a demographic index value for each discrete geographical area in the region of interest; and a data communications interface connected to the processor, the data communications interface configured to transfer demographic data from the database to the processor and to transfer data from the processor to a display device.

22. The system of claim 21 wherein the processor is configured to map the index value for each of the discrete geographical areas using a display device connected to the processor via the data communications interface.

23. The system of claim 22 wherein the map is a thematic map.

24. The system of claim 23 wherein the processor is configured to map target areas onto the thematic map and display the thematic map with the mapped target areas using the display device via the data communications interface.

25. The system of claim 21 wherein the processor is configured to access propagation data and identify base station sites within the target area to provide a predetermined minimum signal strength within the target area.

26. A wireless cellular communications system including a plurality of base stations for providing wireless cellular communications to subscribers in selected target areas wherein base stations are located by:

accessing, with a computer, a database of demographic data in a plurality of selected categories for discrete geographical areas in a region of interest;

determining a separate weighting factor for each of a plurality of substantially, non-overlapping ranges of values within each category of the demographic data and, for each discrete geographical area in the region of interest, determining the separate weighting factor for each of a plurality of substantially, non-overlapping ranges of values for each category of demographic data for that discrete geographical area;

determining a category weight factor for each category of demographic data and applying the category weight factors to the separate weighting factors for each category of demographic data for each of the discrete geographical areas in the region of interest to obtain a category value and combining the category values to obtain a demographic index value for each of the discrete geographical areas in the region of interest;

determining the target areas within the region of interest based upon the demographic indexes of the discrete geographical areas, wherein the target areas are selected to encompass those discrete geographical areas having demographic index values within a predetermined range; and locating the base stations to provide cellular communications services to subscribers in the target areas.

27. The wireless cellular communications system of claim 26 wherein the discrete geographical areas comprise census blocks.

28. The wireless cellular communications system of claim 26 wherein the categories comprise population density, race and income and wherein race is defined as the white percentage of the population.

29. The wireless cellular communications system of claim 28 wherein the category weight factors are 0.4 for population density, 0.35 for median income and 0.25 for race.

30. The wireless cellular communications system of claim 28 wherein the category weight factors are 0.6 for population density, 0.3 for median income and 0.1 for race.

31. The wireless cellular communications system of claim 26 wherein communications services provided by the wireless communications system are offered to subscribers of the system for a flat rate for unlimited use of the system.

32. The wireless cellular communications system of claim 26 wherein communications services provided by the wireless communications system are offered to subscribers of the system for a flat rate for a predetermined number of minutes.

33. The wireless communications system of claim 26 wherein the base stations are configured to provide a minimum strength in the target areas.

34. The wireless communications system of claim 29 wherein the base stations are configured to provide different minimum strengths in different parts of the target areas.

35. A wireless cellular communications system for providing wireless communications to subscribers in a geographical area having a demographic index between about 3.5 and 6.0 wherein the demographic index is calculated as the sum of the products of category weight factors and weighting factors for population density, median income and race for census blocks in the geographical area wherein:
the category weight factors are 0.6 for population density, 0.3 for median income and 0.1 for race and wherein race is defined as the white percentage of the population;
population density weighting factors are 0 for a density of less than 1500, 2 for a population density from 1500 to 3500, 3 for a population density from 3500 to 4900, 4 for a population density from 4900 to 7000 and 6 for a population density greater than 8000;
income distribution weighting factors are 5 for a median income of less than $31,000, 6 for a median income of from $31,000 to $40,000, 6 for a median income of from $40,000 to $50,000, 4 for a median income of from $50,000 to $67,000, 3 for a median income of from $67,000 to $80,000 and 0 for a median income greater than $80,000; and
race distribution weighting factors are 6 for less than 48% white, 5 for from 48% to 69% white, 3 for from 69% to 82% white, 1 for 82% to 91% white and 0 for 91% to 100% white; and wherein the wireless cellular communications system includes a plurality of base stations for providing wireless communications to subscribers of the system in the geographical area.

36. The wireless cellular communications system of claim 35 wherein the category weighting factors are 0.4 for population density, 0.35 for median income and 0.25 for race.

37. The wireless cellular communications system of claim 35 wherein communications services provided by the wireless communications system are offered to subscribers of the system for a flat rate for unlimited use of the system.

38. The wireless cellular communications system of claim 35 wherein communications services provided by the wireless communications system are offered to subscribers of the system for a flat rate for a predetermined number of minutes.

39. The wireless cellular communications system of claim 35 wherein the demographic index is at least 4.5 in the geographical area.

40. The wireless communications system of claim 35 wherein the base stations are configured to provide a minimum strength in the geographical area.

41. The wireless communications system of claim 35 wherein the base stations are configured to provide different minimum strengths in different parts of the geographical area.

42. A method of providing wireless cellular services to subscribers in selected target areas comprising:
accessing, with a computer, a database of demographic data in a plurality of selected categories for discrete geographical areas in a region of interest;
determining a separate weighting factor for each of a plurality of substantially, non-overlapping ranges of values within each category of the demographic data and, for each discrete geographical area in the region of interest, determining the separate weighting factor for each of a plurality of substantially, non-overlapping ranges of values for each category of demographic data for that discrete geographical area;
determining a category weight factor for each category of demographic data and applying the category weight factors to the separate weighting factors for each category of demographic data for each of the discrete geographical areas in the region of interest to obtain a category value and combining the category values to obtain a demographic index value for each of the discrete geographical areas in the region of interest;
determining the target areas within the region of interest based upon the demographic indexes of the discrete geographical areas, wherein the target areas are selected to encompass those discrete geographical areas having demographic index values within a predetermined range; and
locating base stations to provide cellular communications services to subscribers in the target areas.

43. The method of claim 42 wherein the categories comprise population density, race and income and wherein race is defined as the white percentage of the population.

44. The method of claim 42 wherein the discrete geographical areas comprise census blocks.

45. The method of claim 42 wherein the category weight factors are 0.4 for population density, 0.35 for median income and 0.25 for race.

46. The method of claim 42 wherein the category weight factors are 0.6 for population density, 0.3 for median income and 0.1 for race.

47. The method of claim 42 wherein communications services provided by the wireless communications system are offered to subscribers of the system for a flat rate for unlimited use of the system.

48. The method of claim 42 wherein communications services provided by the wireless communications system are offered to subscribers of the system for a flat rate for a predetermined number of minutes.

49. The method of claim 42 wherein the base stations are configured to provide a minimum strength in the target areas.

50. The method of claim 42 wherein the base stations are configured to provide different minimum strengths in different parts of the target areas.

51. The method of claim 42 wherein the base stations are configured to provide different minimum strengths in different parts of the geographical area.

\* \* \* \* \*